United States Patent
Honda et al.

(10) Patent No.: US 7,117,856 B2
(45) Date of Patent: Oct. 10, 2006

(54) FUEL DELIVERY SYSTEMS

(75) Inventors: Yoshihiko Honda, Aichi-ken (JP); Kaneo Imamura, Aichi-ken (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/926,322

(22) Filed: Aug. 26, 2004

(65) Prior Publication Data

US 2005/0045159 A1    Mar. 3, 2005

(30) Foreign Application Priority Data

Aug. 27, 2003   (JP) .............................. 2003-302895

(51) Int. Cl.
*F02M 37/04* (2006.01)
(52) U.S. Cl. ...................... 123/514; 123/509
(58) Field of Classification Search ................ 123/509, 123/514, 510, 506; 137/574, 576
See application file for complete search history.

(56) References Cited

U.S. PATENT DOCUMENTS

| | | | | |
|---|---|---|---|---|
| 4,503,885 A | * | 3/1985 | Hall ........................... | 137/574 |
| 4,834,132 A | * | 5/1989 | Sasaki et al. ................ | 137/143 |
| 5,070,849 A | * | 12/1991 | Rich et al. ................... | 123/509 |
| 5,392,750 A | * | 2/1995 | Laue et al. .................. | 123/509 |
| 5,732,684 A | * | 3/1998 | Thompson ................... | 123/514 |
| 5,749,345 A | * | 5/1998 | Treml .......................... | 123/456 |
| 5,769,061 A | * | 6/1998 | Nagata et al. ............... | 123/509 |
| 5,791,317 A | * | 8/1998 | Eck .............................. | 123/510 |
| 5,960,775 A | * | 10/1999 | Tuckey ........................ | 123/509 |
| 6,123,511 A | * | 9/2000 | Sertier ......................... | 417/87 |
| 6,712,590 B1 | * | 3/2004 | Villela et al. ............ | 417/423.9 |
| 6,923,164 B1 | * | 8/2005 | Mitsudou et al. ........... | 123/509 |

FOREIGN PATENT DOCUMENTS

| | | |
|---|---|---|
| JP | 63 085254 | 4/1988 |
| JP | 2001 020900 | 1/2001 |
| JP | 2002 250255 | 9/2002 |

* cited by examiner

*Primary Examiner*—Carl S. Miller
(74) *Attorney, Agent, or Firm*—Dennison, Schultz & MacDonald

(57) ABSTRACT

A fuel delivery system for delivering fuel from a fuel tank to an engine includes a reservoir disposed within the fuel tank and a fuel pump, such as an electrically driven fuel pump, operable to draw fuel from within the reservoir. The fuel pump has a first port and a second port that independently discharge the fuel from the fuel pump. A first jet pump is operable to draw the fuel within the fuel tank into the reservoir. A first flow path communicates between the first port and the engine. A second flow path communicates between the second port and the first jet pump, so that the fuel within the fuel tank is transferred into the reservoir due to the flow of the fuel supplied to the first jet pump via the second flow path.

20 Claims, 6 Drawing Sheets

FUEL DELIVERY SYSTEMS

This application claims priority to Japanese patent application serial number 2003-302895, the contents of which are incorporated herein by reference.

BACKGROUND OF THE INVENTION

1. Field of the Invention

The present invention relates to fuel delivery systems that are adapted to deliver fuel from a fuel tank to an engine, e.g., an internal combustion engine for an automobile.

2. Description of the Related Art

Various fuel delivery systems are known and include a first known fuel delivery system that will be hereinafter described. As shown in FIG. 5, the first known fuel delivery system includes a substantially cup-shaped reservoir 110, a set plate 111, a fuel pump 113, a fuel filter 120, a pressure regulator 122, and a jet pump 124. The reservoir 110 is placed on a bottom plate 102 of a fuel tank 101. The set plate 111 has a fuel discharge pipe 112 communicating between the inside (interior) and outside (exterior) of the fuel tank 101. The set plate 111 is placed to close an opening 104 formed in a top plate 103 of the fuel tank 101. On the outside of the fuel tank 101, the fuel discharge pipe 112 is connected to an engine via a fuel delivery pipe 106.

The fuel pump 113 is an electrically driven fuel pump and is disposed within the reservoir 110. A suction-side filter 115 is fitted into a suction port (not shown) of the fuel pump 113. A check valve 117 is disposed within a discharge port 113a of the fuel pump 113 in order to maintain residual pressure in the fuel system. The fuel pump 113 has a relief port 113b into which a relief valve 119 is assembled to form a relief valve device.

A fuel filter 120 is disposed so as to surround the circumference of the fuel pump 113 and has a substantially annular configuration. A first pipe Ka connects the discharge port 113a of the fuel pump 113 and a fuel inlet port (not shown) of the fuel filter 120 to one another. A second pipe Kb connects the fuel outlet port (not shown) of the fuel filter 120 and the fuel discharge pipe 112 of the set plate 111 to one another.

The pressure regulator 122 is disposed on the fuel filter 120 and has a return port 122a through which the surplus fuel within the fuel filter 120 is discharged. The jet pump 124 is disposed at the bottom of the reservoir 110. A third pipe Kc connects the return port 122a of the pressure regulator 122 and an introduction port 124a of the jet pump 124 to one another.

According to the first known fuel delivery system, as the fuel pump 113 is driven, the fuel within the reservoir 110 is pumped through the suction-side filter 115 and is then supplied into the fuel filter 120 via the discharge port 113a and the first pipe Ka. Thereafter, the fuel passes through the fuel filter 120 and is further supplied into the engine via the second pipe Kb, the fuel discharge pipe 112 of the set plate 111, and the fuel delivery pipe 106. On the other hand, the surplus fuel within the fuel filter 120 is supplied into the introduction port 124a of the jet pump 124, via the return port 122a of the pressure regulator 122 and the third pipe Kc. At the jet pump 124, the fuel within the fuel tank 101 is transferred into the reservoir 110 due to the flow of the return fuel that is discharged from the return port 122a of the pressure regulator 122. Arrows indicate the path of the flow of the fuel in FIG. 5.

When the fuel pump 113 is stopped, the check valve 117 is closed so that a residual pressure of fuel can be maintained within the passageway of the fuel communicating with the engine.

Japanese Laid-Open Patent Publication Nos. 63-85254 and 2001-20900 teach fuel delivery systems in which jet pumps are operated by fuel discharged from pressure regulators as described in the first known fuel delivery system.

In addition to the first know fuel delivery system, the known fuel delivery systems also include a second known fuel delivery system that will be hereinafter described. The second known fuel delivery system is similar to the first known fuel delivery system and will only be described with respect to the elements that are different from those of the first known fuel delivery system As shown in FIG. 6, according to the second known fuel delivery system, one end of the third pipe Kc is connected to the return port 122a of the pressure regulator 122, while the other end of the third pipe Kc opens into the reservoir 110 in a position adjacent to the bottom of the reservoir 110. In addition, a three-way pipe 200 is disposed so as to intersect the second tube Kb. A branch port 201 of the three-way pipe 200 is connected to the introduction port 124a of the jet pump 124 via a fourth pipe Kd. Further, a check valve 217 is assembled within the fuel discharge pipe 112 of the set plate 111 in order to maintain the residual pressure.

According to the second known fuel delivery system, the surplus fuel within the fuel filter 120 returns to the reservoir 110 via the return port 122a of the pressure regulator 122 and the third pipe Kc.

On the other hand, a part of the fuel that flows through the second pipe Kb is supplied into the introduction port 124a of the jet pump 124 via the three-way pipe 200 and the fourth pipe Kd. Further, at the jet pump 124, the fuel within the fuel tank 101 is transferred into the reservoir 110 due to the flow of the fuel that is discharged from the fourth pipe Kd. Furthermore, when the fuel pump 113 is stopped, the residual pressure of the fuel within the fuel passageway communicating with the engine may be maintained because the check valve 217 within the fuel discharge pipe 112 is closed.

Japanese Laid-Open Patent Publication No. 2002-250255 teaches a fuel delivery system in which a jet pump is operated by the flow of the fuel that is diverged from the flow of the fuel supplied to the engine, as in the second known fuel delivery system.

In case of the first known fuel delivery system shown in FIG. 5, the returned fuel from the pressure regulator operates the jet pump 124. Because the backpressure of the jet pump 124 increases as the diameter of a nozzle 124b of the jet pump 124 decreases, there exists a limitation in minimizing the diameter of the nozzle. Although a relief valve may be assembled within the jet pump 124, there still exists a limitation in minimizing the diameter of the nozzle. Thus, when the backpressure exceeds a predetermined value, the flow of the fuel supplied to the jet pump 124 may be reduced due to an inability to open the pressure regulator 122.

In the case of the second known fuel delivery system shown in FIG. 6, the pressure regulator 122 may adjust the pressure of the fuel even if the backpressure has been increased due to a diameter reduction of the jet pump 124 nozzle. Therefore, the diameter of the nozzle of the jet pump 124 may be reduced without causing the problems of the first known fuel delivery system shown in FIG. 5. In addition, the performance of the jet pump 124 can be improved because no additional relief valve is required for releasing pressure when the backpressure ahead of the jet pump 124 exceeds a predetermined value.

However, the second known fuel delivery system requires the three-way pipe 200 for diverging a flow of fuel away from the flow of the fuel supplied to the engine. In addition, the check valve 217 is required for maintaining the residual pressure on the upstream side of pipe 106, or in other words, within the fuel flow path communicating with the engine. These additional components may cause an increase in manufacturing costs for the second known fuel delivery system. Therefore, the improved performance of the jet pump is obtained only though an associated increase in manufacturing cost.

SUMMARY OF THE INVENTION

It is accordingly an object of the present invention to teach improved fuel delivery systems that can improve the performance of a jet pump while enabling a reduction of associated manufacturing costs.

According to one aspect of the present teachings, fuel delivery systems for delivering fuel from a fuel tank to an engine are taught. The fuel delivery systems include a reservoir disposed within the fuel tank and a fuel pump, such as an electrically driven fuel pump, operable to draw the fuel contained within the reservoir. The fuel pump has a first port and a second port that independently discharge the fuel from the fuel pump. A first jet pump is operable to draw the fuel contained within the fuel tank into the reservoir. A first flow path communicates between the first port and the engine. A second flow path communicates between the second port and the first jet pump, so that the fuel contained within the fuel tank is transferred into the reservoir due to the flow of the fuel supplied to the first jet pump via the second flow path.

Because the first jet pump is operated by the flow of fuel supplied to the first jet pump via the second flow path (the second flow path is separated from the first flow path that communicates with the engine), the diameter of the nozzle of the jet pump may be reduced without significant regard to the buildup of backpressure prior to the jet pump. Backpressure must be considered in the case of the first known fuel delivery system in which the jet pump is operated by the flow of fuel discharged from the pressure regulator. As a result, the first jet pump can be designed so as to exhibit a relatively high level of performance.

In addition, it is not necessary to incorporate a three-way pipe and an additional check valve (for maintaining residual pressure in the downstream side of the three-way pipe) required in the case of the second known fuel delivery system in which the jet pump is operated by the flow of fuel diverged from the fuel supplied to the engine. Therefore, the construction of the fuel delivery system can be simplified and the manufacturing costs can be reduced. In this way, the first jet pump can be designed so as to exhibit a high level of performance while the manufacturing costs can be reduced.

In another aspect of the present teachings, the first port is a main discharge port and the second port is a relief port for discharging a part of the fuel other than the fuel discharged from the first port. Because the main discharge port and the relief port are typically provided in this type of fuel pump, the manufacturing costs can be reduced also in this respect.

In another aspect of the present teachings, the fuel delivery systems further include a relief valve mechanism disposed in the second flow path. When the fuel within the second flow path obtains a pressure exceeding a predetermined value, part of the fuel is released from the second flow path via the relief valve mechanism. Therefore, it is possible to prevent the fuel or the second flow path from being excessively pressurized or over pressurized.

In another aspect of the present teachings, the first jet pump is disposed on the reservoir. Preferably, the first jet pump is formed integrally with the reservoir. Alternatively, the first jet pump may be disposed outside of the reservoir.

In another aspect of the present teachings, the fuel delivery system further includes a fuel filter disposed within the first flow path. A pressure regulator is coupled to the fuel filter and has a return port, so that surplus fuel within the fuel filter is discharged from the return port. A second jet pump serves to draw the fuel within the fuel tank into the reservoir. A third flow path communicates between the return port and the second jet pump, so that the fuel within the fuel tank is transferred into the reservoir due to the flow of the fuel supplied to the second jet pump via the third flow path.

Therefore, the fuel can be effectively drawn into the reservoir by the first and second jet pumps, while the first jet pump can exhibit a relatively high level of performance.

In another aspect of the present teachings, the fuel tank has a first tank chamber and a second tank chamber separately defined within the fuel tank. The first jet pump and the second jet pump are disposed in order to transfer the fuel within the first tank chamber and the second tank chamber to the reservoir. The reservoir may be disposed within either tank chamber but the reservoir is preferably disposed within the first tank chamber.

In another aspect of the present teachings, the first jet pump is disposed within the second tank chamber and the second jet pump is disposed within the first tank chamber. Preferably, the second flow path extends from the first tank chamber to the outside of the fuel tank and then extends into the second tank chamber. The position of the first jet pump may be resiliently maintained in a position adjacent to the bottom of the second tank chamber.

Alternatively, the first jet pump may be disposed within the first tank chamber and the second jet pump may be disposed within the second tank chamber. Preferably, the third flow path extends from the first tank chamber to the outside of the fuel tank and then extends into the second tank chamber. The position of the second jet pump may be resiliently maintained in a position adjacent to the bottom of the first tank chamber.

DETAILED DESCRIPTION OF THE INVENTION

Each of the additional features and teachings disclosed above and below may be utilized separately or in conjunction with other features and teachings to provide improved methods and systems for delivering fuels. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Various representative embodiments of the present invention will now be described with reference to FIGS. 1 to 4.

First Representative Embodiment

Figure 1:
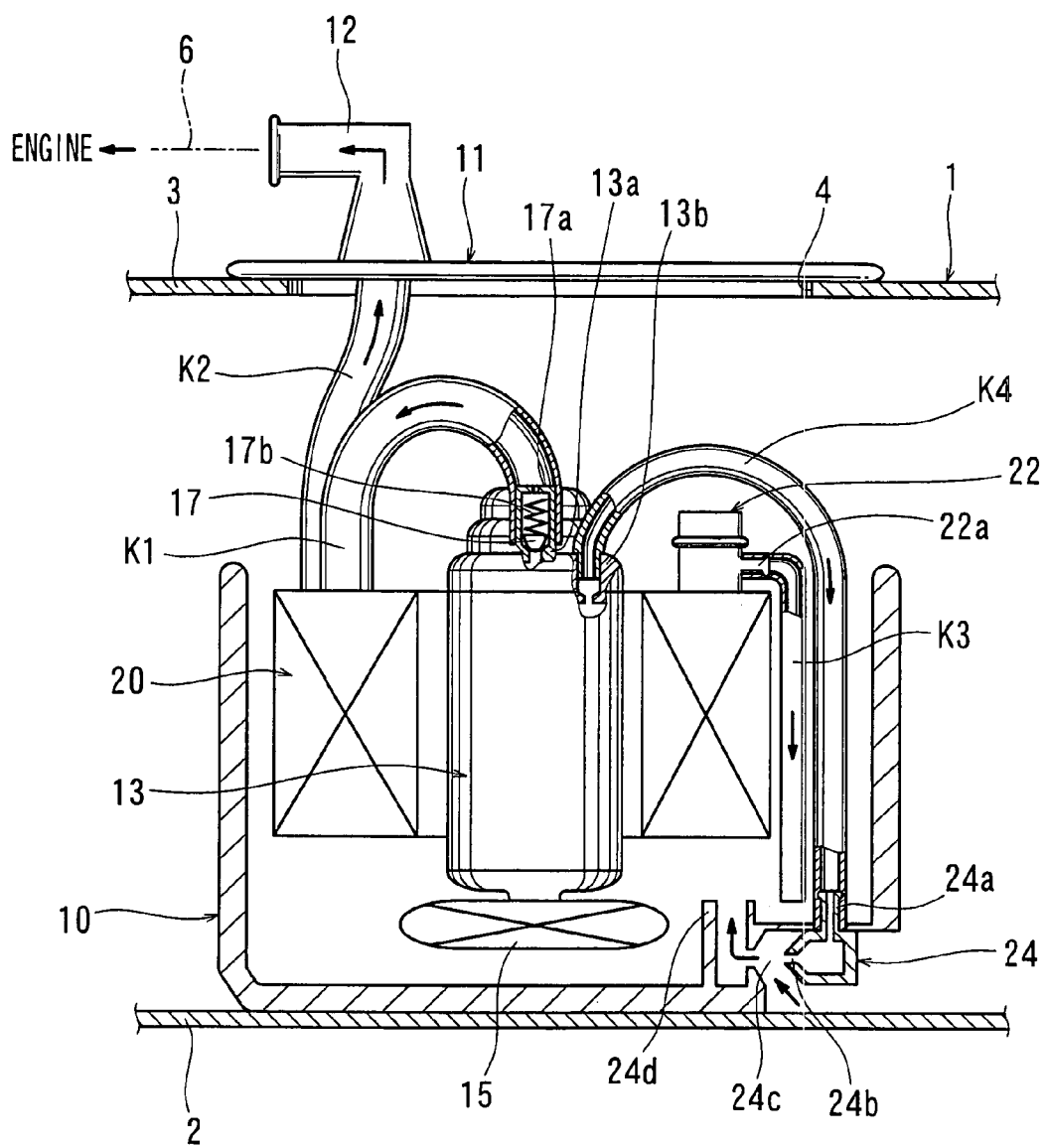
FIG. 1 is a cross-sectional view of a first representative fuel delivery system.

As shown in FIG. 1, a first representative fuel delivery system generally includes a reservoir 10, a set plate 11, a fuel pump 13, a fuel filter 20, a pressure regulator 22, and a jet pump 24. These elements will be hereinafter described. Here, the first representative fuel delivery system is assembled within a fuel tank 1 that defines a substantially sealed space for storing fuel. The fuel tank 1 has a bottom plate 2 and a top plate 3 with an opening 4. The fuel tank 1 also has a circumferential wall (not shown).

The reservoir 10 has a substantially cup-shaped configuration and is placed on the bottom plate 2 of the fuel tank 1. The set plate 11 is secured to the upper surface of the top plate 3 of the fuel tank 1 in order to sealingly close the opening 4 of the top plate 3. The set plate 11 has a fuel discharge pipe 12 that communicates between the interior and exterior of the fuel tank 1. On the exterior (outside) of the fuel tank 1, the fuel discharge pipe 12 is connected to an engine, e.g., an internal combustion engine of an automobile, via a fuel delivery pipe 6.

Although not shown in the drawings, the reservoir 10 and the set plate 11 are connected to each other via a connection device that has a level adjusting function. The connection device includes a spring that serves to press the reservoir 10 against the bottom plate 2 of the fuel tank 1.

Figure 5:
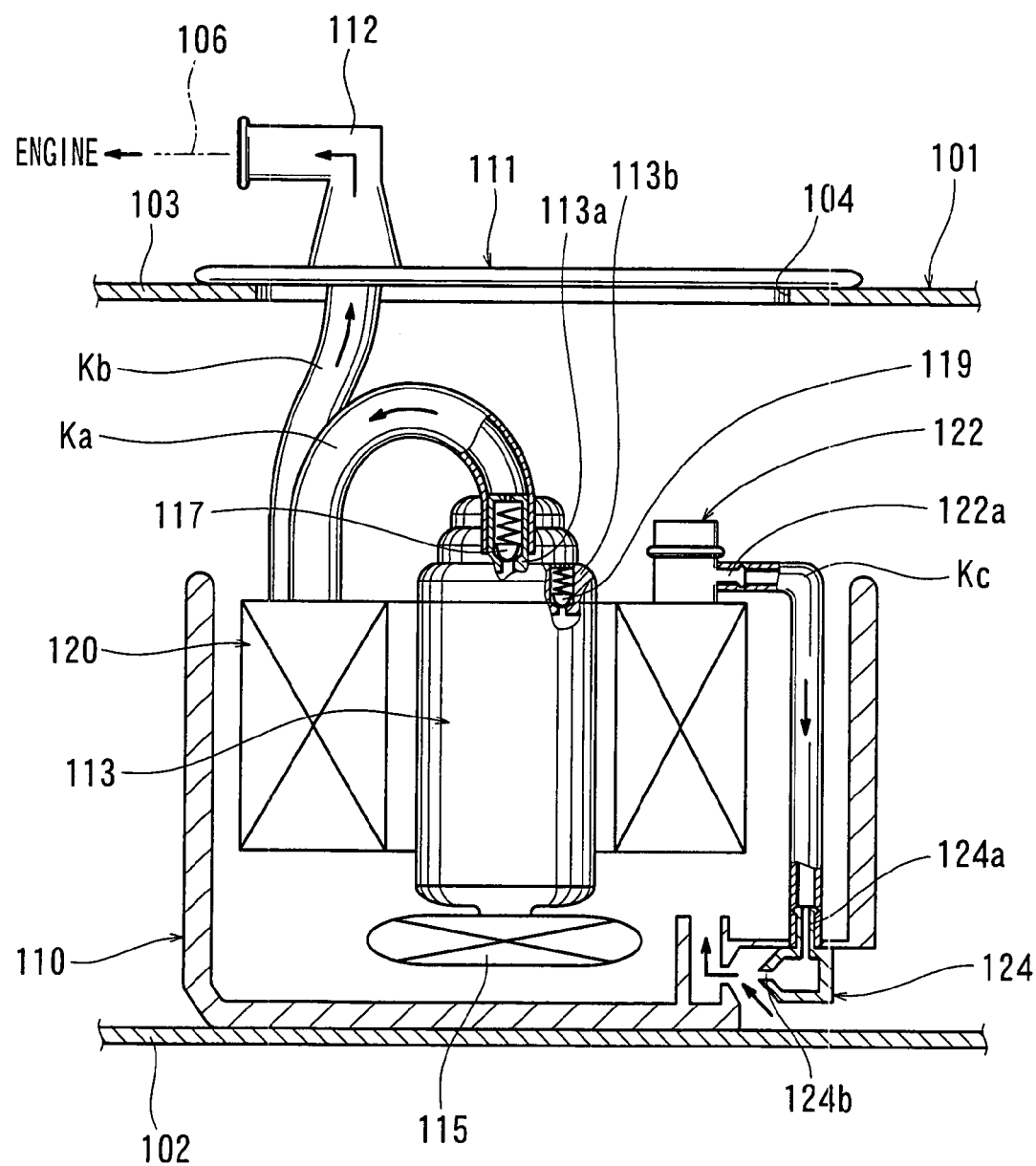
FIG. 5 is a cross-sectional view of a first known fuel delivery system.

The fuel pump 13 is a known motor driven in-tank fuel pump and is supported within the reservoir 10. The fuel pump 13 has a suction port (not shown) for drawing the fuel contained within the reservoir 10 and a discharge port 13a for discharging the drawn fuel in an upward direction. A suction-side filter 15 is fitted onto the suction port. The fuel pump 13 further includes a relief port 13b. The relief port 13b corresponds to the relief port 113b of the fuel pump 113 of the first known fuel delivery system shown in FIG. 5, but relief port 13b does not include a relief valve corresponding to the relief valve 119. Therefore, the fuel is discharged from the relief port 13b without intervention of a relief valve.

A check valve 17 is disposed within the discharge port 13a of the fuel pump 13 in order to maintain residual pressure. The check valve 17 is assembled into a flow channel defined within a valve housing 17a that is fixed within the discharge port 13a, so that the check valve 17 is operable to open and close the flow channel of the valve housing 17a. The check valve 17 is biased by a valve spring 17b that is guided within the valve housing 17a, so that the check valve 17 is prevented from being skewed with respect to the discharge port 13a.

When the fuel pump 13 is driven, the fuel is discharged from the discharge port 13a and the check valve 17 is forced to open due to the pressure of the fuel discharged into the discharge port 13a. On the other hand, when the fuel pump is stopped, the check valve 17 is closed by the pressure of the fuel on the downstream side of the check valve 17. Therefore, a residual pressure within the flow channel on the side of the engine, i.e., on the downstream side of the discharge port 13a, can be maintained.

The fuel filter 20 has a filter case (not shown) having a substantially annular configuration and has a filter element (not shown) disposed within the filter case. The filter case has a fuel inlet and a fuel outlet (not shown). The fuel inlet of the filter case is connected to the discharge port 13a of the fuel pump 13 via a first pipe K1. The fuel outlet of the filter case is connected to the fuel discharge pipe 12 of the set plate 11 via a second pipe K2. Here, the fuel filter 20 is disposed on the high-pressure discharge side as compared to the suction-side filter 15 and is therefore generally called a "high-pressure filter."

The pressure regulator 22 is disposed on the fuel filter 20 (more specifically on the filter case) and has a return port 22a that is adapted to discharge the surplus fuel within the fuel filter 20. One end of a third pipe K3 is connected to the return port 22a and the other end of the third pipe K3 opens into the reservoir 10 at a position adjacent to the bottom of the reservoir 10.

The jet pump 24 is disposed within the reservoir 10 in a position adjacent to the bottom of the reservoir 10. The jet pump 24 has an introduction port 24a, a suction port 24c, and a delivery port 24d. The introduction port 24a is configured to introduce the fuel into the jet pump 24 and has a nozzle 24b at one end on the downstream side. The suction port 24c is open into the fuel tank 1 at a position adjacent to the nozzle 24b and serves to draw the fuel within the fuel tank 1 due to the flow of the fuel blown out (expelled) from the nozzle 24b. The introduction port 24a is connected to the relief port 13b of the fuel pump 13 via a fourth pipe K4.

The first, second, third, and fourth pipes, K1, K2, K3, and K4, may be flexible pipes, such as pipes made of nylon for example.

In operation of the first representative fuel delivery system, when the fuel pump 13 is driven, the fuel within the reservoir 10 is drawn via the suction-side filter 15 and is then delivered into the fuel filter 20 via the discharge port 13a and the first pipe K1. The fuel that has traveled through the fuel filter so as to be filtered by the filter element is then delivered to the engine via the second pipe K2, the fuel discharge pipe 12 of the set plate 11, and the fuel delivery pipe 6.

On the other hand, the surplus fuel within the fuel filter 20 is returned to the reservoir 10 via the return port 22a of the pressure regulator 22 and the third pipe K3.

In addition, the fuel discharged from the relief port 13b of the fuel pump 13 is delivered to the introduction port 24a of the jet pump 24 via the fourth pipe K4. Then, due to the flow of the fuel that is expelled from the nozzle 24b of the introduction port 24a, the fuel within the fuel tank 1 is drawn via the suction port 24c and is transferred into the reservoir 10 via the delivery port 24d, together with the fuel that has been expelled from the nozzle 24b.

When the fuel pump 13 is stopped, the check valve 17 disposed within the discharge port 13a is closed, so that the residual pressure of the fuel within the flow path communicating with the engine can be maintained. In this embodiment, the first pipe K1, the fuel filter 20, the second pipe K2, the fuel discharge pipe 12, and the fuel delivery pipe 6, configure such a flow path communicating with the engine.

Figure 6:
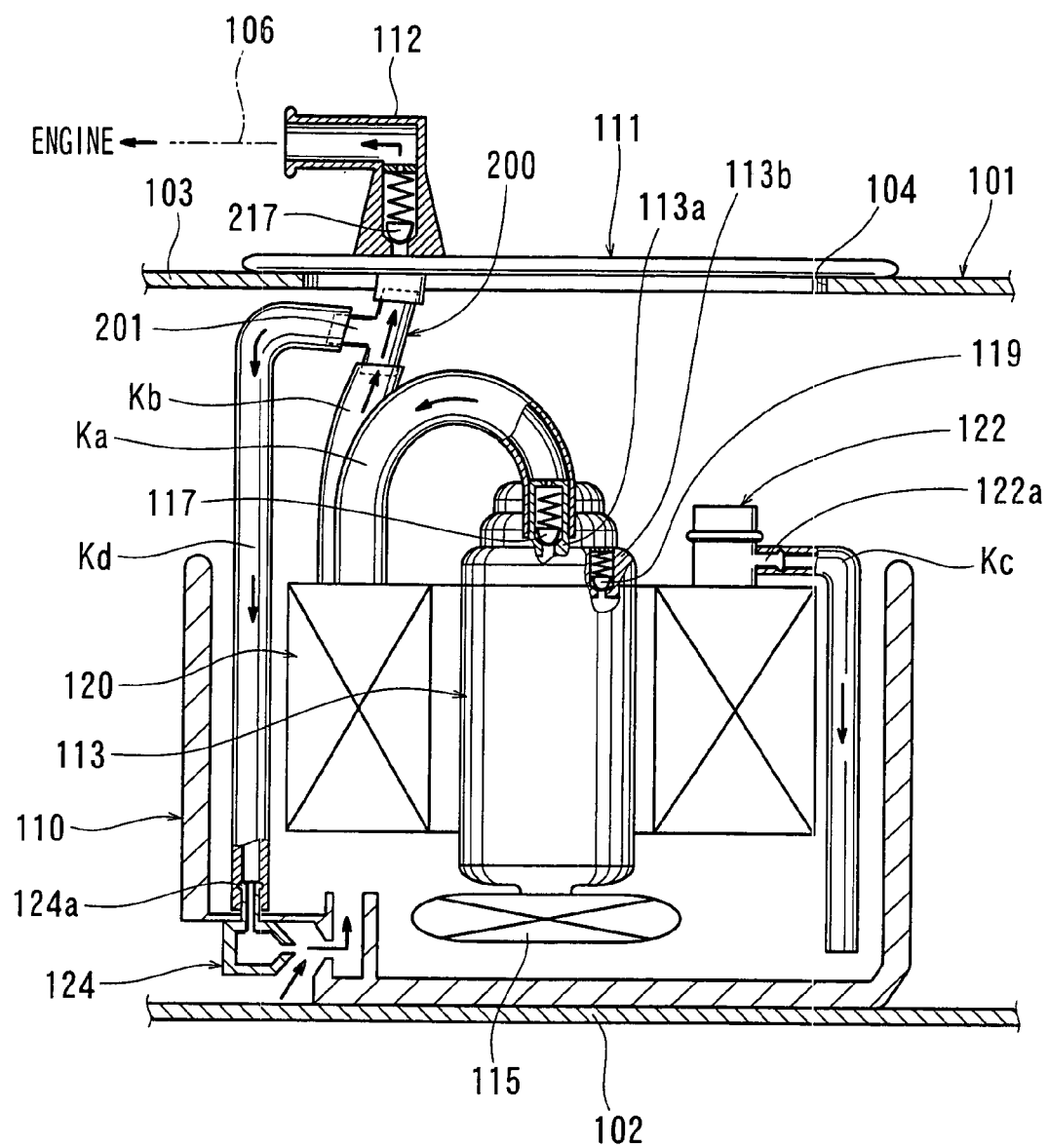
FIG. 6 is a cross-sectional view of a second known fuel delivery system.

According to the first representative fuel delivery system, the jet pump 24 is operated by the fuel that is delivered from the relief port 13b of the fuel pump 13 to a region other than the engine. Therefore, in comparison with the configuration in which the jet pump 24 is operated by the return fuel from the pressure regulator 22, as in the first known fuel delivery system, the diameter of the nozzle 24b of the jet pump 24 can be reduced independently of significant backpressure concerns, and therefore, the performance of the jet pump 24 can be improved. In addition, in comparison with the configuration in which the jet pump 24 is operated by fuel diverged from the fuel that is delivered to the engine, as in the second known fuel delivery system, it is not necessary to provide the three-way pipe 200 (shown in FIG. 6) and the check valve 217 (shown in FIG. 6) disposed on the downstream side of the three-way pipe in order to maintain the residual pressure. Therefore, the construction of the fuel delivery system may be simplified and consequently, it may be possible to reduce the manufacturing costs. In other words, the manufacturing costs may be reduced while improving the performance level of the jet pump 24.

In addition, according to the first representative fuel delivery system, the fuel is discharged from the relief port 13b, which is provided to the fuel pump 13 without any valve mechanism containing a relief valve (i.e., any relief valve mechanism), to a region other than the fuel filter 20. Therefore, the fuel pump 13 is not required to have a dedicated discharge port for discharging the fuel to a region other than the fuel filter. As a result, the manufacturing costs of the fuel pump 13 can be reduced.

Figure 2:
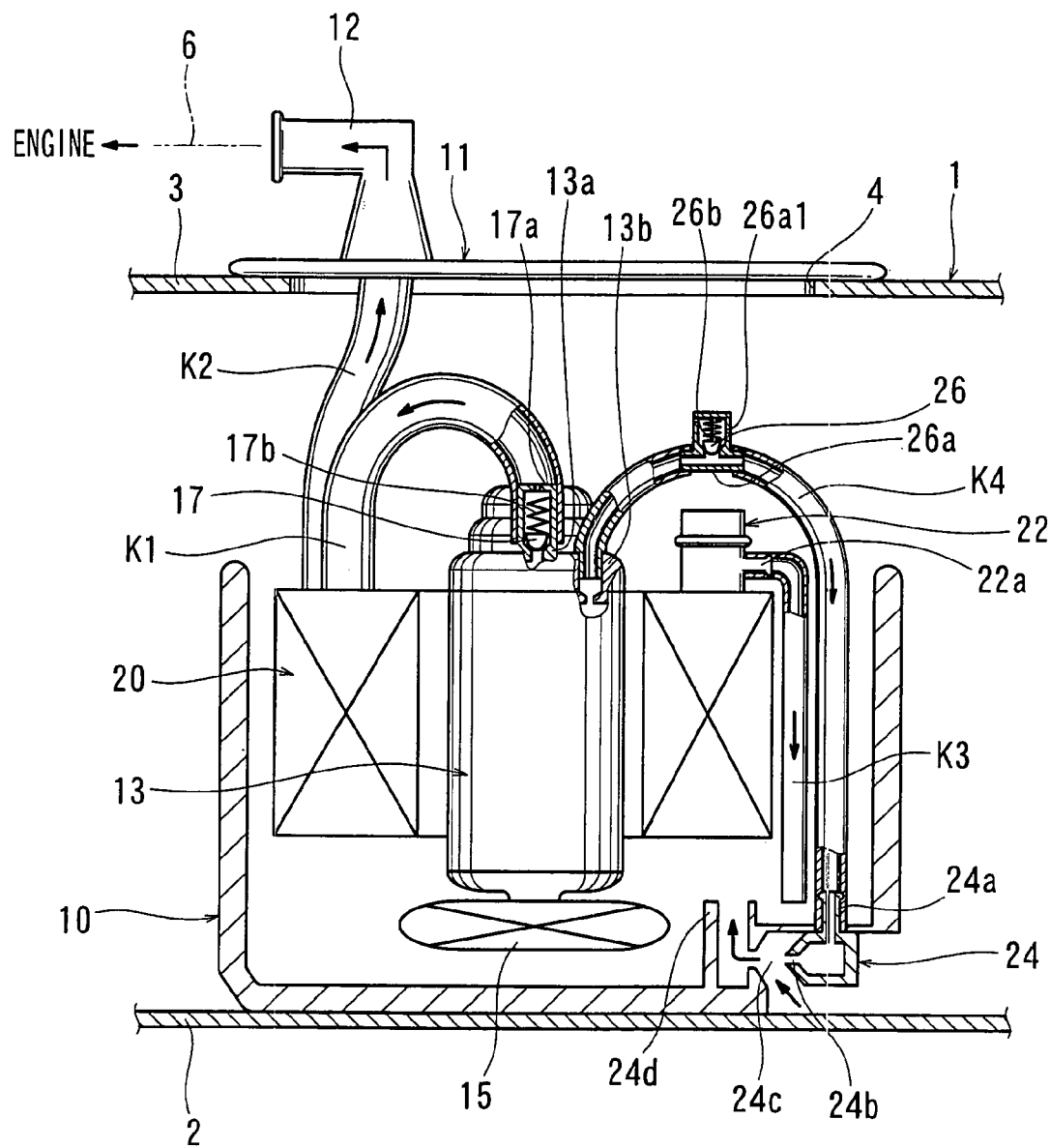
FIG. 2 is a cross-sectional view of a second representative fuel delivery system.
Figure 3:
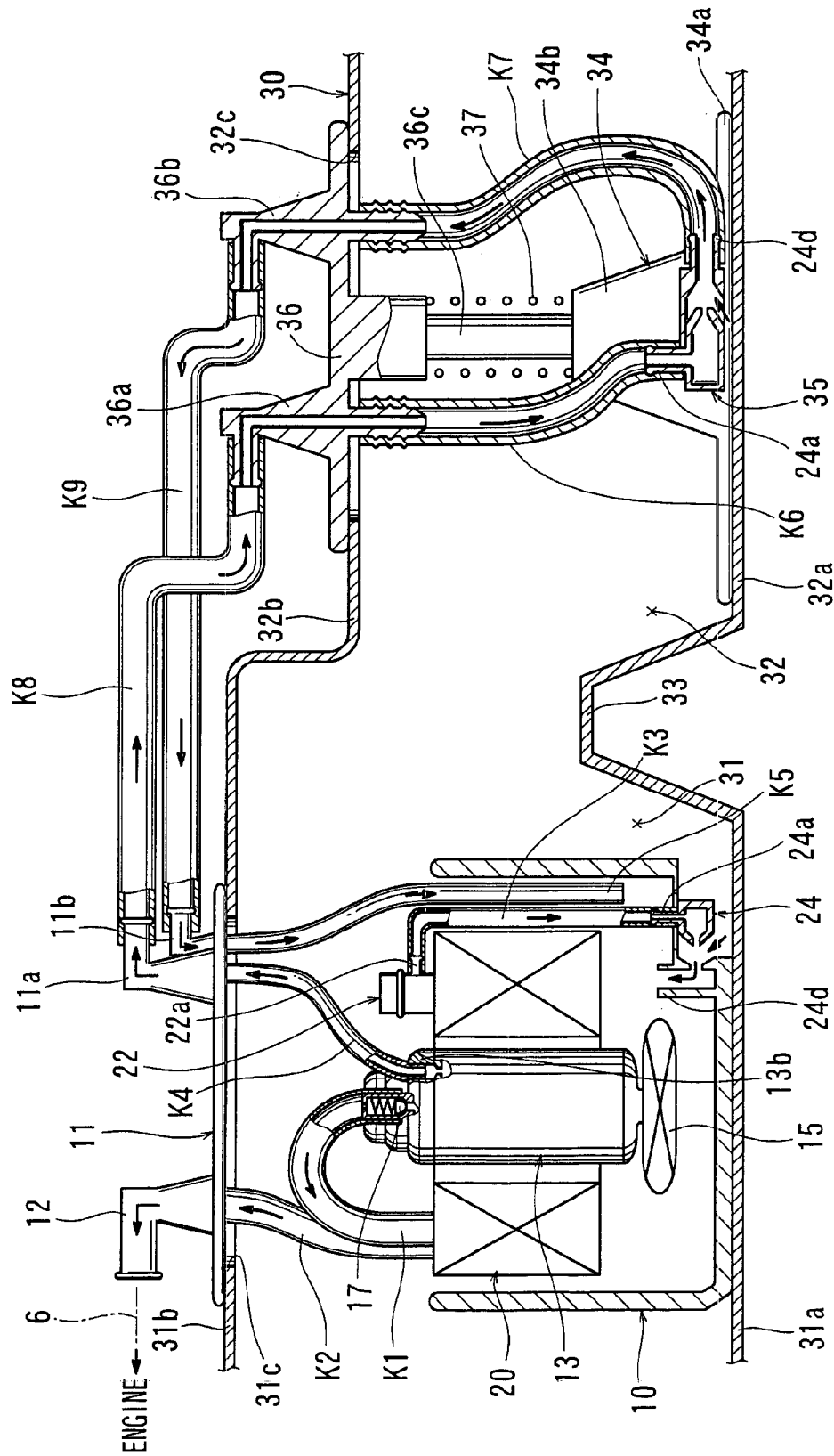
FIG. 3 is a cross-sectional view of a third representative fuel delivery system.
Figure 4:
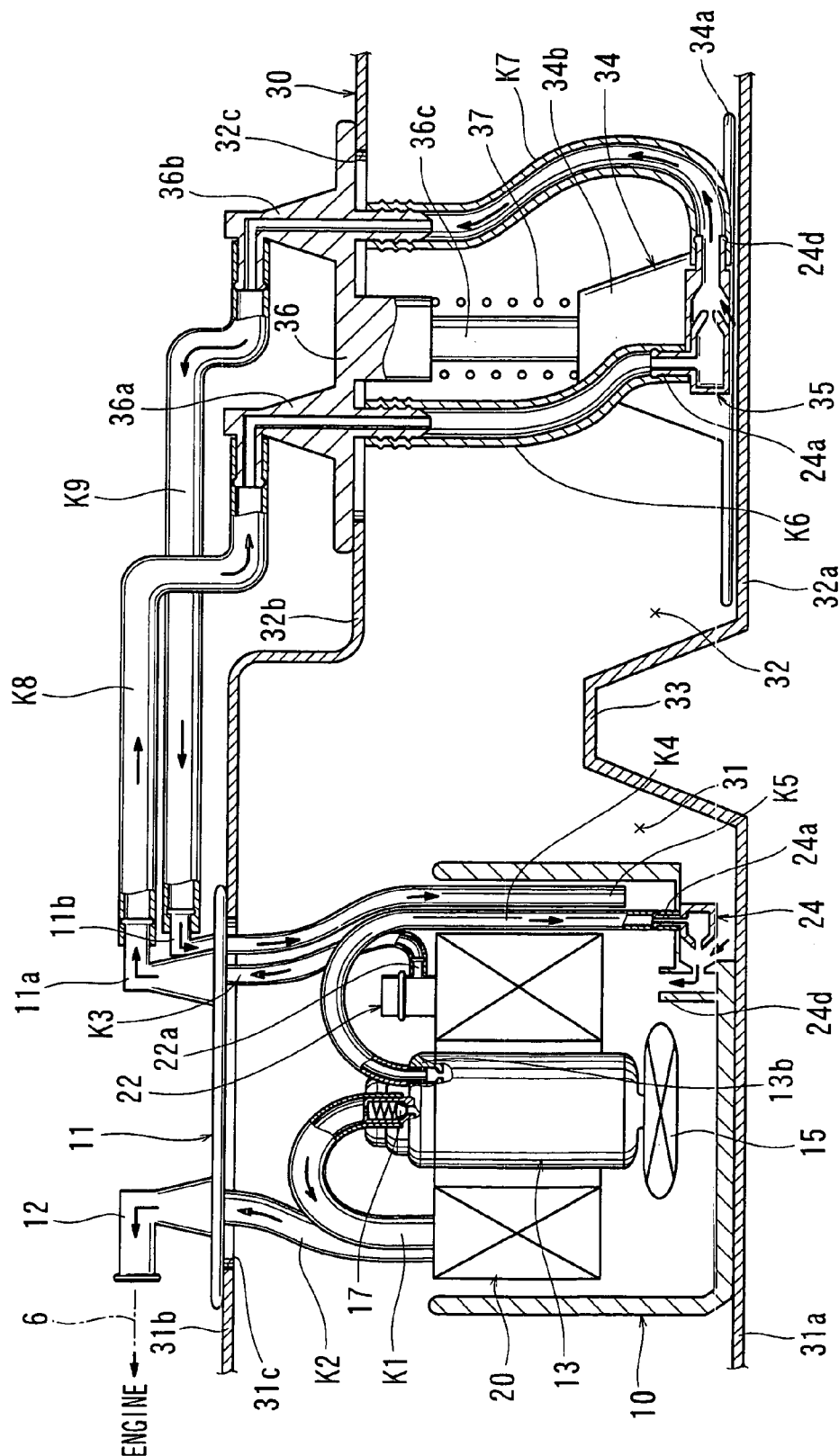
FIG. 4 is a cross-sectional view of a fourth representative fuel delivery system.

Second to fourth representative fuel delivery systems will now be described with reference to FIGS. 2 to 4. The second to fourth representative fuel delivery devices are modifications of the first representative fuel delivery system. Therefore, in FIGS. 2 to 4, like members are given the same reference numerals as in FIG. 1 and the description of these members will not be repeated.

Second Representative Embodiment

The second representative fuel delivery system will now be described with reference to FIG. 2. The second representative fuel delivery system is different from the first representative fuel delivery system in that a relief valve 26 is assembled into a flow path. The fourth pipe K4, communicating between the fuel pump 13 and the jet pump 24, configures the flow path. More specifically, as shown in FIG. 2, a substantially T-shaped valve housing 26a is inserted between sections of the fourth pipe K4. The valve housing 26a has two opposing connecting portions joining sections of the fourth pipe K4. The valve housing 26a has a branch pipe 26a1 extending substantially perpendicular to the connecting portions and the branch pipe 26a1 has one end open to the outside of the fourth pipe K4. The relief valve 26 is assembled within the branch pipe 26a1 in order to open and close a flow channel defined within the branch pipe 26a1. A valve spring 26 is also assembled within the branch pipe 26a1 and normally biases the relief valve 26 in a closing direction.

When the fuel within the fourth pipe K4 has exceeded a predetermined pressure value, the relief valve 26 is forced to open by the pressure of the fuel against the biasing force of the valve spring 26b. As a result, fuel is released to the outside of the branch pipe 26a1. The released fuel may be discharged into the reservoir 10. When the pressure of the fuel within the fourth pipe K4 has been lowered below a predetermined pressure value, the relief valve 26 may be closed due to the resilient force of the valve spring 26b.

According to the second representative fuel delivery system, even if the fuel within the fourth pipe K4 has been over pressurized, the relief valve 26 may release the excessive pressure within the fourth pipe K4 to the outside of the fourth pipe K4. Therefore, it is possible to prevent or minimize any damage to a portion(s) of the flow channel, which may have a relatively low resistance against pressure, due to the excessive pressure that may be generated in the pipes K1, K2, or K4.

Third Representative Embodiment

The third representative fuel delivery system will now be described with reference to FIG. 3. The third representative fuel delivery system is different from the first representative fuel delivery system primarily in that the fuel tank 1 is replaced by a fuel tank 30. Fuel tank 30 has a saddle-shaped configuration. More specifically, the fuel tank 30 has a first tank chamber 31 and a second tank chamber 32 that are delimited by a boundary portion 33. The boundary portion 33 is configured as a raised portion formed within the fuel tank 30 between the bottom plate 31a of the first tank chamber 31 and the bottom plate 32a of the second tank chamber 32. The third representative fuel delivery system is disposed within the first tank chamber 31 in the same manner as in the first representative fuel delivery system. Thus, the bottom plate 31a of the first tank chamber 31 corresponds to the bottom plate 2 of the fuel tank 1 of the first representative embodiment. A top plate 31b and an opening 31c formed in the top plate 31b of the first tank chamber 31 respectively correspond to the top plate 3 and the opening 4 of the first representative embodiment. In addition, for the purpose of clarifying the description, the set plate 11 and the first jet pump 24 will hereinafter be respectively called "the first set plate 11" and "the first jet pump 24".

In addition, according to the third representative fuel delivery system, a first outlet pipe 11a and a first inlet pipe 11b are attached to the first set plate 11 so as to extend between the interior and the exterior of the fuel tank 30.

Further, the fourth pipe K4, located within the fuel tank 30 and communicating with the relief port 13b of the fuel pump 13, is connected to the first outlet pipe 11a instead of the first jet pump 24 as in the first representative embodiment. The third pipe K3 communicating with the return port 22a of the pressure regulator 22 is connected to the introduction port 24a of the first jet pump 24.

One end of a fifth pipe K5 is connected to the first inlet pipe 11b. The other end of the fifth pipe K5 opens into the reservoir 10 in a position adjacent to the bottom of the reservoir 10.

A support member 34 is placed on the bottom plate 32a of the second tank chamber 32. The support member 34 has a base plate 34a and a mount 34b disposed centrally of the base plate 34a and extending upward therefrom. A second jet pump 35 is mounted to the support member 34. The configuration of the second jet pump 35 is the same as the first jet pump 24, although the dimensions and openings of each jet pump may be optimized for their particular location. Therefore, the second jet pump 35 will not be described further.

An opening 32c is formed in the top plate 32b of the second tank chamber 32. A second set plate 36 is secured onto the top plate 32b in order to close the opening 32c. A guide shaft 36c extends vertically downward from the central portion of the second set plate 36. The lower end of the guide shaft 36c is slidably fitted into the mount 34b of the support member 34 such that the guide shaft 36c can move vertically relative to the mount 34b. A valve spring 37 is fitted around the guide shaft 36c and is disposed between the support member 34 and the second set plate 36. The support member 34 is pressed against the upper surface of the bottom plate 32a by the resilient force of the valve spring 37. In this way, the support member 34 (in particular the mount 34b), the guide shaft 36c, and the valve spring 37, constitute a coupling device that couples the support member 34 and the second set plate 36 to each other such that the level of the support member 34 relative to the second set plate 36 can be automatically adjusted. Another coupling device having the same construction as the coupling device described above may be incorporated in order to couple the reservoir 10 and the first set plate 11.

A second inlet pipe 36a and a second outlet pipe 36b are formed integrally with the second set plate 36 so as to respectively extend between the interior and exterior of the fuel tank 30. Within the fuel tank 30, the second inlet pipe 36a is connected to the introduction port 24a of the second jet pump 35 via a sixth pipe K6. The second outlet pipe 36b is connected to the delivery port 24d of the jet pump 35 via a seventh pipe K7.

Outside of the fuel tank 30, the first outlet pipe 11a is connected to the second inlet pipe 36a via an eighth pipe K8. The first inlet pipe 11b is connected to the second outlet pipe 36b via a ninth pipe K9. Similar to pipes K1 to K4, the pipes K5 to K9 may be made of flexible pipes, such as nylon pipes.

According to the third representative embodiment, when the fuel pump 13 is driven, the fuel within the reservoir 10 may be supplied to the engine via the fuel filter 20 in the same manner as in the first representative embodiment. However, the surplus fuel within the fuel filter 20 is discharged from the return port 22a of the pressure regulator 22 to the introduction port 24a of the first jet pump 24 via the third pipe K3. Then, due to the flow of the fuel or the return fuel expelled from the nozzle 24b, fuel within the first tank chamber 31 may be transferred together with the return fuel into the reservoir 10 via the delivery port 24d.

In the meantime, the fuel discharged from the relief port 13b of the fuel pump 13 is transferred to the introduction port 24a of the second jet pump 35 via the fourth pipe K4, the first outlet pipe 11a, the eighth pipe K8, the second inlet pipe 36a, and the sixth pipe K6. Due to the flow of the fuel expelled from the nozzle of the second jet pump 35, fuel within the second tank chamber 32 is drawn into the delivery port 24d. The fuel delivered from the delivery port 24d is further transferred into the reservoir 10 via the seventh pipe K7, the second outlet pipe 36b, the ninth pipe K9, the first inlet pipe 11b, and the fifth pipe K5.

In this way, according to the third representative embodiment, it is possible to operate two jet pumps, i.e., the first jet pump 24 and the second jet pump 35. In addition, as discussed in the first representative embodiment in connection with the first jet pump 24, it is possible to improve the performance of the second jet pump 35 while reducing manufacturing costs.

Fourth Representative Embodiment

The fourth representative fuel delivery system will now be described with reference to FIG. 4. The fourth representative fuel delivery system is different from the third representative fuel delivery system in that the fourth pipe K4, communicating with the relief port 13b of the fuel pump 13, is connected to the introduction port 24a of the first jet pump 24 in the same manner as the first representative fuel delivery system. In addition, the third pipe K3, communicating with the return port 22a of the pressure regulator 22, is connected to the first outlet pipe 11a of the first set plate 11.

According to the fourth representative embodiment, when the fuel pump 13 is driven, the fuel within the reservoir 10 is delivered to the engine via the fuel filter 20 in the same manner as in the third representative embodiment. (see FIG. 3).

However, the fuel discharged from the relief port 13b of the fuel pump 13 is delivered to the introduction port 24a of the first jet pump 24. The fuel within the first tank chamber 31 is drawn due to the flow of the fuel expelled from the nozzle 24b, and the fuel is transferred into the reservoir 10 via the delivery port 24d.

In the meantime, the surplus fuel within the fuel filter 20 is delivered from the return port 22a of the pressure regulator 22 to the introduction port 24a of the second jet pump 35 via the third pipe K3, the first outlet pipe 11a, the eighth pipe K8, the second inlet pipe 36a, and the sixth pipe K6. The fuel within the second pump chamber 32 is drawn due to the flow of the fuel expelled from the nozzle of the second jet pump 35, and the fuel is discharged from the delivery port 24d. The fuel discharged from the delivery port 24d is further transferred into the reservoir 10 via the seventh pipe K7, the second outlet pipe 36b, the ninth pipe K9, the first inlet pipe 11b and the fifth pipe K5.

In this way, according to the fourth representative embodiment, it is possible to operate two jet pumps, i.e., the first jet pump 24 and the second jet pump 35. In addition, similar to the first representative embodiment, it is possible to improve the performance level of the first jet pump 24 while the reducing manufacturing costs.

(Possible Alternative Arrangements of First to Fourth Representative Embodiments)

The present invention may not be limited to the above representative embodiments but may be modified in various ways. For example, although the fuel supplied from the relief port 13b of the fuel pump 13 has been used for expelling out of the jet pumps in the above representative embodiments, the fuel pump 13 may have a dedicated discharge port for supplying fuel to the jet pumps.

This invention claims:

1. A fuel delivery system for delivering fuel from a fuel tank to an engine, comprising:
a reservoir disposed within the fuel tank;
a fuel pump arranged and constructed to draw the fuel from within the reservoir, wherein the fuel pump has a longitudinal axis in a vertical direction and has a suction section disposed on the lower side of the fuel pump and a first port and a second port disposed on the upper side opposite to the suction section, the first port and the second port discharging the fuel from the fuel pump;
a first jet pump arranged and constructed to draw the fuel from within the fuel tank into the reservoir;
a first flow path communicating between the first port and the engine;
a second flow path communicating between the second port and the first jet pump, so that the fuel within the fuel tank is transferred into the reservoir due to the flow of the fuel supplied to the first jet pump via the second flow path.

2. The fuel delivery system as in claim 1, wherein the first port is a main discharge port and the second port is a relief port for discharging a portion of the fuel other than another portion of fuel discharged from the first port.

3. The fuel delivery system as in claim 2, further including a relief valve mechanism disposed in the second flow path, so that a part of the fuel is released from the second flow path via the relief valve mechanism when a fuel pressure within the second flow path exceeds a predetermined value.

4. The fuel delivery system as in claim 1, wherein the first jet pump is disposed on the reservoir.

5. The fuel delivery system as in claim 4, wherein the first jet pump is formed integrally with the reservoir.

6. The fuel delivery system as in claim 1, wherein the first jet pump is disposed outside of the reservoir.

7. The fuel delivery system as in claim 1, further comprising:
   a fuel filter disposed in the first flow path;
   a pressure regulator coupled to the fuel filter and having a return port, so that a surplus fuel within the fuel filter is discharged from the return port;
   a second jet pump arranged and constructed to draw the fuel within the fuel tank into the reservoir; and
   a third flow path communicating between the return port and the second jet pump, so that the fuel within the fuel tank is transferred into the reservoir due to the flow of the fuel supplied to the second jet pump via the third flow path.

8. The fuel delivery system as in claim 7, wherein:
   the fuel tank has a first tank chamber and a second tank chamber separately defined within the fuel tank,
   the first jet pump and the second jet pump are disposed in order to transfer the fuel contained within the first tank chamber and the second tank chamber to the reservoir.

9. The fuel delivery system as in claim 8, wherein the reservoir is disposed within the first tank chamber.

10. The fuel delivery system as in claim 9, wherein the first jet pump is disposed within the second tank chamber and the second jet pump is disposed within the first tank chamber.

11. The fuel delivery system as in claim 10, wherein the second flow path extends from the first tank chamber to the outside of the fuel tank and then extends into the second tank chamber.

12. The fuel delivery system as in claim 11, further including a device for resiliently maintaining the position of the first jet pump in a position adjacent to a bottom of the second tank chamber.

13. The fuel delivery system as in claim 9, wherein the first jet pump is disposed within the first tank chamber and the second jet pump is disposed within the second tank chamber.

14. The fuel delivery system as in claim 13, wherein the third flow path extends from the first tank chamber to the outside of the fuel tank and then extends into the second tank chamber.

15. The fuel delivery system as in claim 14, further including a device for maintaining the position of the second jet pump in a position adjacent to a bottom of the second tank chamber.

16. A fuel delivery system for delivering fuel from a fuel tank to an engine, comprising:
   a reservoir disposed within the fuel tank;
   a fuel pump arranged and constructed to draw the fuel from within the reservoir, comprising;
      a first port; and
      a second port;
   wherein the first port and the second port independently discharge the fuel from the fuel pump;
   a first jet pump arranged and constructed to draw the fuel from within the fuel tank into the reservoir;
   a first flow path communicating between the first port and the engine comprising;
      a fuel filter comprising;
         a pressure regulator comprising;
            a return port;
   wherein the fuel filter operates to filter fuel transferred within the first flow path; and
   wherein the pressure regulator is constructed so as to release a portion of the fuel within the first flow path when a fluid pressure of the fuel within the first flow path exceeds a predetermined pressure value; and
   wherein the return port is constructed to direct the flow of the portion of the fuel within the first flow path released by the pressure regulator; and
   a second flow path communicating between the second port and the first jet pump,
   wherein the second flow path enables the transfer of fuel from within the fuel tank to the reservoir.

17. The fuel delivery system as in claim 16, further comprising:
   a third flow path communicating between the return port and a second jet pump,
   wherein the third flow path enables the additional transfer of fuel from within the fuel tank to the reservoir.

18. The fuel delivery system as in claim 17, further comprising:
   a first chamber in the fuel tank, and
   a second chamber in the fuel tank;
   wherein the first jet pump is located in one of the first chamber and the second chamber; and
   wherein the second jet pump is located in the other of the first chamber and the second chamber.

19. The fuel delivery system as in claim 18, further comprising:
   a check valve located within the first port;
   wherein the check valve enables the first flow path to maintain a residual pressure after the fuel pump stops operating.

20. The fuel delivery system as in claim 16, further comprising:
   a relief valve mechanism disposed in the second flow path,
   wherein the relief valve mechanism is constructed so as to allow a portion of the fuel within the second flow path to exit the second flow path via the relief valve mechanism when the fluid pressure of the fuel within the second flow path exceeds a predetermined value.

* * * * *